United States Patent

[11] 3,602,741

[72] Inventors Elliott L. Ressler
Elkins Park;
Thomas F. Long, Warminster, both of, Pa.
[21] Appl. No. 49,796
[22] Filed June 25, 1970
[45] Patented Aug. 31, 1971
[73] Assignee The United States of America as represented by the Secretary of the Navy

[54] INTERFACE COUPLING CIRCUIT
8 Claims, 3 Drawing Figs.

[52] U.S. Cl. .......... 307/264, 179/15 BL, 328/104, 328/171
[51] Int. Cl. .......... H03k 1/14
[50] Field of Search .......... 307/260, 264, 268; 328/14, 31, 104, 156, 169, 171; 179/15 BL

[56] References Cited
UNITED STATES PATENTS

| | | | |
|---|---|---|---|
| 2,636,081 | 4/1953 | Feldman | 328/104 X |
| 2,693,533 | 11/1954 | Femmer | 307/243 X |
| 2,923,888 | 2/1960 | Buesing | 328/156 X |

*Primary Examiner*—Donald D. Forrer
*Assistant Examiner*—John Zazworsky
*Attorneys*—R. S. Sciascia and Henry Hansen

ABSTRACT: A system for modifying a plurality of input signals and generating a single output is utilized in order to couple the information received to an output system. The plurality of input signals are modified and applied to a pair of transistor amplifiers that have their collectors connected together and provide but a single output to a voltage level shifter that controls the voltage level of the signal. The signal is then further amplified to interface with an output load.

INVENTORS
ELLIOTT L. RESSLER
THOMAS F. LONG

BY

[signature]

ATTORNEY

INTERFACE COUPLING CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to interfacing in which information contained in a plurality of electrical signals is to be applied to a system that does not have the capability of processing the signals in present form. More particularly, the system must combine signals, provide waveshaping and various other modifications to signals that are to serve as the input to a load.

It is often necessary in existing equipments and systems when supplying the information that is received from one component as an input to a second component to modify and/or combine the signal with a second signal so that the system receiving the signal can process it. Normally the interface circuitry that performs this task is tailored to the particular system for which it is used and has no general application. The great variety of systems and types of equipment and data information signals make it impossible to have a truly standard interface circuit that may be considered general purpose. What is adequate or satisfactory for one system may or may not be for another. Also other considerations need to be taken into account such as circuit component type, power requirements, cost, size, weight, and reliability.

It is therefore desirable to provide an interface circuit that provides a plurality of functions and which with obvious modifications could be used in a large number of systems.

SUMMARY OF THE INVENTION

Accordingly, it is the general purpose of the present invention to provide a solid state interface system in a Mini Talk II transmitter accepting signals from state of the art microelectronic digital circuits and combining and modifying such signals for further processing by other standardized components. It is a further object to process such input signals by sequentially modifying each individual input signal, linearly combining them, amplifying the signals and providing a level control to correspond to the input requirements of the next system. In addition, the system provides level shifting techniques to accommodate differing voltage level requirements dependent on whether information signals are being generated.

In the present system this is obtained by applying a first pulse signal to a filtering system and a second pulse signal to an attenuator. Both signals are then inverted by a dual-type transistor amplifier. The inverted output is then level shifted depending on the presence or absence of the applied signals by means of a voltage divider circuit in which a switching transistor is incorporated. The output signal is then amplified, level controlled, and again inverted so as to provide a signal that is conventional for the following component.

DESCRIPTION OF THE PREFERRED EMBODIMENT

Figure 1:
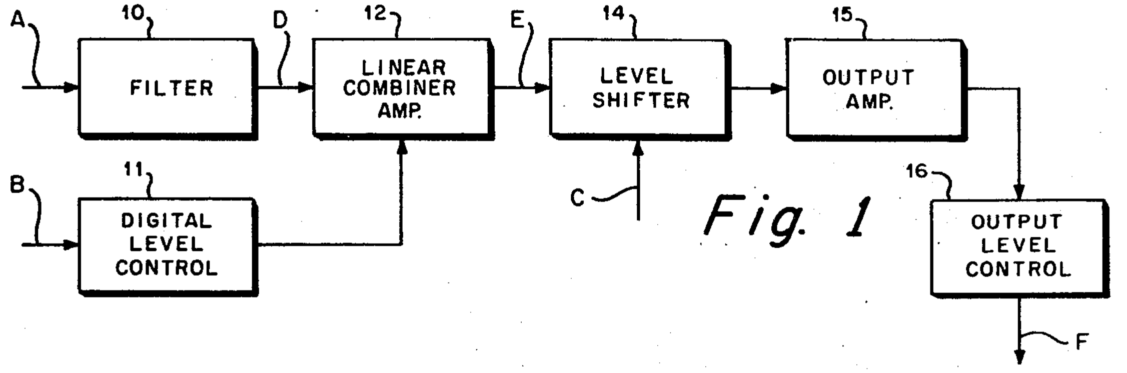
FIG. 1 is a block diagram of a preferred embodiment according to the invention.
Figure 3:
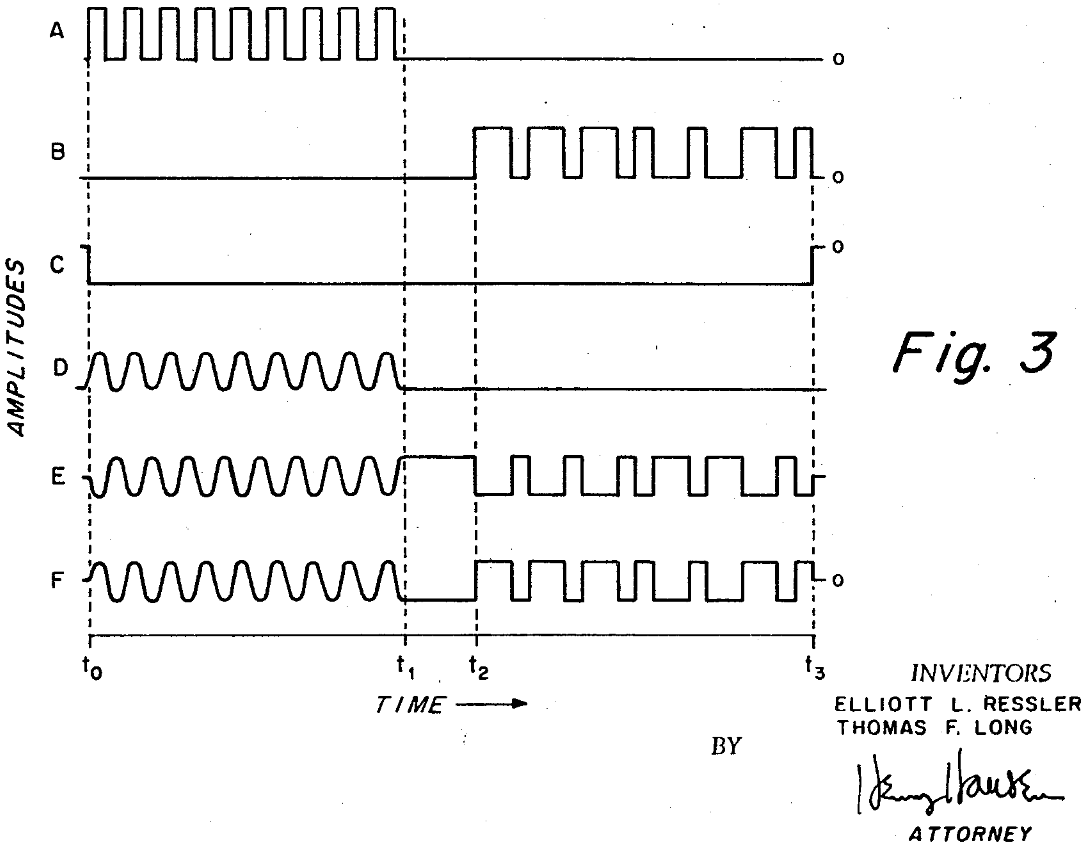
FIG. 3 are waveforms present at specific points of the circuit shown in FIGS. 1 and 2.

Referring now to the drawing and more particularly to FIGS. 1 and 3 there is shown a filter 10 receiving a 10 kHz. digital square wave signal A. The filter 10 removes the higher harmonics from the square wave signal and provides a sine wave output D. After a fixed period of time a pulse train signal B of a plurality of pulse widths is applied to digital level control 11 for attenuation. The sine wave D and attenuated output pulse train from level control 11 are successively apPlied to linear combiner amplifier 12 that generates an output signal E. The output signal E has its DC level shifted by a level shifter 14 that receives an additional C signal for control purposes. The E signal is then applied sequentially to output amplifier 15 and output level control 16. The output signal F received from output level control 16 is then suitable for further processing by the following component in the overall system. For instance, the next component in the system could receive the 10 kHz. sine wave for switching purposes and the signal that originated as B could provide information.

Figure 2:
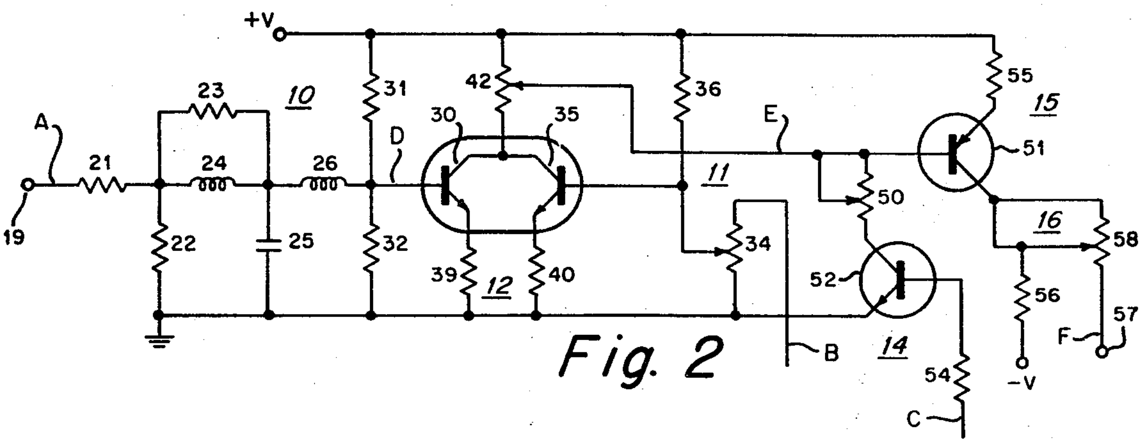
FIG. 2 is a schematic of the block diagram of FIG. 1.

Referring now to FIG. 2 the input signal A is applied to a terminal 19 connected to a resistor 21 whose output is connected to ground through resistor 22 and in addition is connected to the parallel combination of resistor 23 and inductor 24. The outer contact of resistor 23 and inductor 24 are connected to ground through capacitor 25 and in addition are connected to inductor 26. The other side of inductor 26 is connected to the base of transistor 30 and a voltage divider network comprising of resistors 31 and 32. The other contact of resistor 32 is connected to ground. The pulse signals B are applied to potentiometer 34 whose movable contact is connected to the base of transistor 35 and to resistor 36 and whose opposite contact is grounded. the emitters of transistors 30 and 35 are connected to ground through the respective resistors 39 and 40. The collectors of transistors 34 and 35 are tied together and connected to potentiometer 42. A +V voltage supply is connected to the opposite contacts of potentiometer 42 and resistors 31 and 36. The movable arm of potentiometer 42 is connected to both the variable resistor 50 and the base of transistor 51. The opposite contact of resistor 50 is connected to the collector electrode of transistor 52 whose base is connected to receive a C signal for control purposes through resistor 54. The transistor 52 is of the NPN type and has its emitter connected to ground. The transistor 51 is of the PNP type and has its emitter connected to the +V voltage supply through resistor 55. The collector electrode of transistor 51 is connected to a −V voltage supply through resistor 56 and to the output terminal 57 through variable resistor 58.

The operation of the device will now be explained with reference to the FIGURES. At time $t_0$ a digital square wave signal designated as A, of a preset frequency, in the present embodiment 10 kHz., is applied to terminal 19. A T-filter section comprised of capacitor 25 and inductors 24 and 26 remove the higher harmonics from signal A and pass to the base of transistor amplifier 30 a sine wave of the fundamental frequency of the applied square wave signal. All other frequency components are suppressed. Resistors 21, 22 and 23 provide buffering and isolation between the output of the digital signal source A and the input to the T-section filter. At time $t_1$ the generation of the A signal is completed and the system is ready to receive the B signal. In this particular application there is a fixed delay or guard period between $t_1$ and $t_2$ to time space the A and B signals. The operation of this sequencing is not shown as it does not comprise any part of this invention but could be accomplished by manual switching although in this application automatic means are provided. This guard period is a result of the particular message format which is being generated and not a result or requirement of the coupling circuit. The B signal is applied to potentiometer 34 whose wiper arm is connected in series with resistor 36 for application of attenuated pulses to the base of transistor 35. The respective signals applied to the bases of transistors 30 and 35 are sequentially amplified with the output signal being taken off the wiper arm of potentiometer 42. Each base drive input of transistors 30 and 35 has its own respective bias control network comprising resistors 31 and 32 for transistor 30 and potentiometer 34 and resistor 36 for transistor 35. The signal E is taken from the wiper arm of potentiometer 42. The voltage level of the signal E is determined by a voltage divider network comprising the +V supply, potentiometer 42, variable resistor 50, transistor 52, and ground. The transistor 52 acts as a switch under the control of a digital turn on pulse applied to the base of transistor 52. When the normal input signals are present, there is no input signal applied to the base of transistor 52. Transistor 52 therefore is turned off and the output level shifter has no effect on the circuit. However, when the input signals are not present a positive DC level C which may be manually or automatically provided is applied to the base of transistor 52 rendering the transistor conductive and thereby lowering the voltage level of the E signal. This causes more current to flow in transistor 51 and causes a shift in the collector voltage of transistor 51 in the present embodiment from a −9 volts to a 0 potential. Between time $t_0$ and $t_3$ when the signal C is removed from transistor 52 the signal at E rises. Inasmuch as transistor 51 is a PNP transistor the current flow through transistor 52 is reduced and the voltage level at the collector of transistor 51 is −9 volts. The application of either signal A or signal B causing an inverted signal at E is further inverted by transistor 51 so that the original polarity of the signals to the input is retained at the output. The difference in the signals is in the amplitudes and signal A has been changed from a pulse signal to a sine wave signal. The output signal is as shown at F and has an output level in the present system from −9 to +9 volts. This signal is now suitable to be applied as a sequentially coded modulation signal of a transmitter.

There has therefore been shown a system which provides an interface between two systems that are not compatible. It is necessary in the present embodiment to successively modify and combine a plurality of digital input pulses. In addition, a shift in the null voltage level is required that is dependent on the presence or absence of signals. The present system accomplishes the above modifications while retaining the message content of the input signals.

Obviously many modifications and variations of the present invention are possible in the light of the above teachings. It is therefore to be understood that within the scope of the appended claims the invention may be practiced otherwise than as specifically described.

What is claimed is:

1. An interface coupling circuit comprising:
filter means for modifying and attenuating a first square wave input signal;
attenuating means for attenuating a second square wave input signal;
combining means connected to receive said first and second input signal and for providing a sequentially combined and amplified output signal;
level shifting means connected to receive said output signal and for providing a change in bias level exclusively during the period of time before and after receipt of said output signal in response to receipt of a DC input signal; and
level control means for amplifying said combining means output signal and providing a signal with a predetermined voltage range about a predetermined level.

2. An interface coupling circuit according to claim 1 wherein said filter means further comprises:
resistor means connected to receive said first input square wave signal for providing buffering and isolation; and
a T-section filter connected to said resistor means for passing, only the fundamental frequency of said square wave signal.

3. An interface coupling circuit according to claim 2 wherein said T-section filter further comprises:
a pair of inductors serially connected at a junction point; and
a capacitor having one of its contacts connected to said junction point.

4. An interface coupling circuit according to claim 3 wherein said combining means further comprises:
a plurality of transistors having their collectors joined together, respectively receiving sequential input signals and combining and amplifying said sequential input signals; and
a potentiometer connected to said collectors for providing an adjustable level output for said combined and amplified sequential signals.

5. An interface coupling circuit according to claim 4 further comprising:
said transistors are NPN transistors;
the emitters of said transistors are individually connected to ground through resistive elements; and
the bases of said transistors are adapted to receive said sequential input signals.

6. An interface coupling circuit according to claim 5 wherein said attenuating means further comprises:
a potentiometer connected to said combining means for providing an attenuated signal to said combining means.

7. An interface coupling circuit according to claim 6 wherein said level shifting means further comprises:
a variable resistor connected to receive said output signal; and
switching means for connecting said resistor to ground in response to receipt of said DC input signal.

8. An interface coupling circuit according to claim 7 wherein said switching means further comprises:
an NPN transistor including an emitter, collector and base with said emitter connected to ground, said collector connected to said variable resistor and said base adapted to receive said DC input signal.